Figure 1:
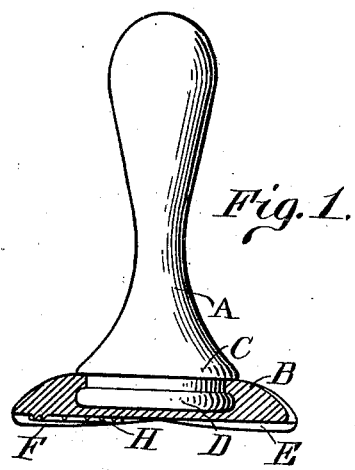

No. 755,521. PATENTED MAR. 22, 1904.
W. G. MORTIMER.
APPLIANCE FOR CLEANING TINS, POTS, AND OTHER VESSELS OR UTENSILS.
APPLICATION FILED DEC. 30, 1903.
NO MODEL.

Witnesses:
C. D. Kesler,
Dennis Sumby,

Inventor
William G. Mortimer
By James L. Norris.
Atty.

No. 755,521.  
Patented March 22, 1904.

UNITED STATES PATENT OFFICE.

WILLIAM GEORGE MORTIMER, OF TOORAK, VICTORIA, AUSTRALIA.

APPLIANCE FOR CLEANING TINS, POTS, AND OTHER VESSELS OR UTENSILS.

SPECIFICATION forming part of Letters Patent No. 755,521, dated March 22, 1904.

Application filed December 30, 1903. Serial No. 187,222. (No model.)

*To all whom it may concern:*

Be it known that I, WILLIAM GEORGE MORTIMER, a subject of the King of Great Britain, residing at No. 4 St. John's road, Toorak, in the State of Victoria and Commonwealth of Australia, have invented a new and Improved Appliance for Cleaning Tins, Pots, and other Vessels or Utensils, of which the following is a specification.

It is a common practice for dairy farmers in the operation of separating cream from milk to run the cream from the separator into kerosene tins and subsequently to empty the contents of these tins into cream-cans for conveyance to the creamery. As a certain amount of the cream adheres to the sides and bottom of the tins, it is the custom for the operator to remove this by means of his fingers. This besides being a slow procedure is likely to contaminate the cream unless the fingers are absolutely clean. Now my appliance has been devised mainly for the purpose of effectually removing from the sides and bottom of such tins all cream adhering thereto after the bulk has been emptied out. It is, however, applicable to cleaning any vessel or utensil whatever its shape may be.

The appliance consists, essentially, of the combination with a handle of a scraper composed of hard rubber or other similar material of an elastic nature, such scraper having three edges, two of which are straight, forming a right angle at the point where they meet, and the other being in the form of an arc. At each point where the ends of the arc join the straight edges the corners are rounded off, one more so than the other. The appliance is therefore capable of cleaning any vessel or utensil whether of rectangular, circular, or other shape.

The handle is preferably made of wood and has two shoulders about three-sixteenths of an inch apart at one end. The scraper is provided with a circular recess in the center of its top side to receive the end of the handle. To attach the one to the other, the end of the handle is placed over the recess in the scraper, which is then sprung over the bottom shoulder and is held firmly between the two shoulders.

The under side or face of the scraper is provided with three cutters, each of which extends in a curved line from the center outward, and the spaces between such cutters are cross-hatched. These cutters have perpendicular cutting edges, and both they and the cross-hatching are molded or formed out of the material of which the scraper is composed.

Figure 2:
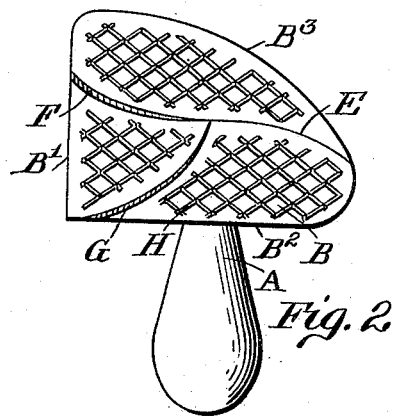
Figure 3:
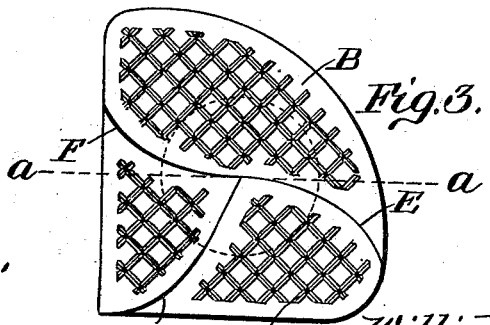

Referring now to the drawings hereto annexed, Figure 1 is an elevation of my improved appliance for cleaning tins, pots, and other vessels or utensils, the scraper being shown in section taken on the line $a\,a$ in Fig. 3. Fig. 2 is an isometrical projection of my appliance, showing clearly the construction of the cutters on the under side or face of the scraper. Fig. 3 is a plan of the under side or face of the scraper, showing the cross-hatching in the spaces between the cutters.

A is the handle, and B is the scraper of hard rubber or other similar material of an elastic nature.

$B'$ and $B^2$ are the straight edges of the scraper, and $B^3$ is the edge in the form of an arc.

C and D are shoulders on the end of the handle A to retain thereon the scraper, which has a circular recess (not shown) in the center of its top side and which is sprung over the shoulder D and is held firmly between it and shoulder C.

E, F, and G are the cutters on the under side or face of the scraper, which cutters extend in a curved line from the center to one of each of the edges of the scraper, the cutting edge of each cutter being perpendicular, as shown in Fig. 2 of the drawings.

H is the cross-hatching between the cutters.

The scraper B is made in the same way as other rubber articles, such as boot-heels—viz., by subjecting a piece of rubber of the size required to heat, after which it is placed in a mold and subjected to both pressure and heat until it becomes vulcanized.

In using my appliance it is grasped by the handle A, and if the vessel or utensil to be cleaned is of rectangular shape one of the edges $B'$ or $B^2$ is drawn across the surface to be cleaned, when everything adhering to it is removed. If the vessel or utensil is circular or of any shape other than rectangular, the edge B³ is used. If a vessel or utensil, such as a pot, is to be cleaned to which the material which has been cooked therein very closely adheres, the under side or face of the scraper is placed in contact with the surface to be cleaned, and the appliance is then rotated, when the cutters E F G and cross-hatching H will quickly remove everything from it.

Having now particularly described and ascertained the nature of my said invention and in what manner the same is to be performed, I declare that what I claim is—

1. A device of the character described comprising the combination with a handle, of a scraper connected thereto and constructed of elastic material having its lower face formed with a plurality of cutters extending in a curved line from the center of said face to the edges of the scraper and said scraper provided with three edges, two of which are straight and form a right angle and the other extending in the form of an arc, the meeting-points of the edge extending in the form of an arc and the straight edges being rounded off.

2. A device of the character described comprising the combination with a handle, of a scraper connected thereto and constructed of elastic material having its lower face formed with a plurality of cutters extending in a curved line from the center of said face to the edges of the scraper and said scraper provided with three edges, two of which are straight and form a right angle and the other extending in the form of an arc, the meeting-points of the edge extending in the form of an arc and the straight edges being rounded off, and the lower face of said scraper further provided with hatches between the cutters and said edges.

3. A device of the character described comprising a scraper of elastic material having its working face formed with a plurality of cutters extending from the center of said face to the edges of the scraper, and a handle extending into the scraper and provided with shoulders of different diameters suitably spaced apart and between which a portion of the scraper is clamped, thereby securing the handle to the scraper.

In witness whereof I have hereunto set my hand in presence of two witnesses.

WILLIAM GEORGE MORTIMER.

Witnesses:
WALTER S. BOYSTON,
FRANK BOYSTON.